(12) United States Patent
Wakabayashi et al.

(10) Patent No.: US 12,183,942 B2
(45) Date of Patent: Dec. 31, 2024

(54) BATTERY PACK

(71) Applicant: SANYO Electric Co., Ltd., Daito (JP)

(72) Inventors: Takeaki Wakabayashi, Hyogo (JP); Kensaku Takeda, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 514 days.

(21) Appl. No.: 17/631,142

(22) PCT Filed: Jul. 27, 2020

(86) PCT No.: PCT/JP2020/028645
§ 371 (c)(1),
(2) Date: Jan. 28, 2022

(87) PCT Pub. No.: WO2021/020328
PCT Pub. Date: Feb. 4, 2021

(65) Prior Publication Data
US 2022/0263188 A1    Aug. 18, 2022

(30) Foreign Application Priority Data
Aug. 1, 2019 (JP) .................................. 2019-142580

(51) Int. Cl.
*H01M 50/325* (2021.01)
*H01M 10/643* (2014.01)
(Continued)

(52) U.S. Cl.
CPC ....... *H01M 50/325* (2021.01); *H01M 10/643* (2015.04); *H01M 10/6551* (2015.04);
(Continued)

(58) Field of Classification Search
CPC .......... H01M 10/643; H01M 10/6551; H01M 10/6554; H01M 50/325; H01M 50/227;
(Continued)

(56) References Cited

U.S. PATENT DOCUMENTS

| 2005/0164080 A1 | 7/2005 | Kozu et al. |
| 2010/0104928 A1* | 4/2010 | Nishino ................. H01M 50/30 429/53 |
| 2014/0234677 A1* | 8/2014 | Yoon ................... H01M 50/308 429/89 |
| 2015/0280190 A1* | 10/2015 | Ohshiba .............. H01M 50/209 429/100 |

(Continued)

FOREIGN PATENT DOCUMENTS

| JP | 10-162795 A | 6/1998 |
| JP | 2001-196039 A | 7/2001 |

(Continued)

OTHER PUBLICATIONS

International Search Report dated Sep. 29, 2020, issued in counterpart International Application No. PCT/JP2020/028645. (2 pages).

*Primary Examiner* — Matthew J Merkling
(74) *Attorney, Agent, or Firm* — WHDA, LLP (57) ABSTRACT

A battery pack includes a battery block including battery cells connected to one another and a case accommodating the battery block. Each battery cell includes a discharge valve on an end surface of the cell which is configured to open when an internal pressure exceeds a predetermined pressure. The battery cells are arranged on a straight line such that respective end surfaces of the calls face each other. The battery block has a discharge gap between the end surfaces of the cells facing each other which is configured to guide exhaust gas from the discharge valve The case includes lower case, an upper case, a heat dissipation plate arranged in lower case and between the lower case and battery block, and a bendable heat-resistant cover protruding from a side edge of the heat dissipation plate and arranged at a position covering an opening of discharge gap.

13 Claims, 5 Drawing Sheets

(51) Int. Cl.
   *H01M 10/6551* (2014.01)
   *H01M 10/6554* (2014.01)
   *H01M 50/213* (2021.01)
   *H01M 50/227* (2021.01)
   *H01M 50/276* (2021.01)
   *H01M 50/367* (2021.01)
   *H02J 7/00* (2006.01)

(52) U.S. Cl.
   CPC ..... *H01M 10/6554* (2015.04); *H01M 50/213* (2021.01); *H01M 50/227* (2021.01); *H01M 50/276* (2021.01); *H01M 50/367* (2021.01); *H02J 7/0013* (2013.01); *H02J 7/00719* (2020.01); *H01M 2200/20* (2013.01)

(58) Field of Classification Search
   CPC ............. H01M 50/276; H01M 50/213; H01M 50/367; H01M 50/30–394; H02J 7/00719; H02J 7/0013
   See application file for complete search history.

(56) References Cited

U.S. PATENT DOCUMENTS

| | | | |
|---|---|---|---|
| 2016/0036023 A1* | 2/2016 | DeKeuster | H01M 10/425 429/53 |
| 2016/0197324 A1* | 7/2016 | DeKeuster | H01M 50/55 429/82 |
| 2017/0373287 A1* | 12/2017 | Yamashita | H01M 50/367 |
| 2019/0296293 A1* | 9/2019 | Scharner | H01M 50/367 |
| 2020/0212396 A1* | 7/2020 | Chen | A62C 3/16 |
| 2020/0212398 A1* | 7/2020 | You | H01M 50/30 |
| 2022/0069409 A1* | 3/2022 | Wakabayashi | H01M 50/247 |
| 2022/0069411 A1* | 3/2022 | Wakabayashi | H01M 50/24 |
| 2022/0077540 A1* | 3/2022 | Wakabayashi | H01M 50/392 |
| 2022/0085453 A1* | 3/2022 | Wakabayashi | H01M 50/204 |

FOREIGN PATENT DOCUMENTS

| | | |
|---|---|---|
| JP | 2003-234096 A | 8/2003 |
| JP | 2012-243689 A | 12/2012 |
| JP | 2015-133169 A | 7/2015 |
| JP | 2016-35817 A | 3/2016 |

* cited by examiner

BATTERY PACK

TECHNICAL FIELD

The present invention relates to a battery pack including a chargeable battery and an exterior case accommodating the battery therein.

BACKGROUND ART

In recent years, a battery pack used as a power source of an electric device has been further required to have high output. The battery pack has employ a non-aqueous electrolyte secondary battery such as a lithium ion battery having excellent efficiency per unit volume. Although the lithium ion battery has a high output, an internal pressure may increase for some reason. In order to ensure safety against an increase in the internal pressure of the battery, a discharge valve configured to open at a predetermined pressure to prevent rupture is provided. When the discharge valve opens, the battery is abnormally heated, and a high-temperature gas is vigorously ejected from the discharge valve. A battery pack including an exterior case having a hole therein configured to discharge exhaust gas discharged from the discharge valve to the outside has been developed (see PTL 1).

A battery pack including an exterior case having through-holes therein to increase air permeability inside the battery pack so as to prevent the case from having heat remaining therein by facilitating dissipation of the heat has been developed (see PTL 2).

CITATION LIST

Patent Literature

PTL 1: Japanese Patent Laid-Open Publication No. 2001-196039
PTL 2: Japanese Patent Laid-Open Publication No. 10-162795

SUMMARY

Technical Problem

In a conventional battery pack, a hole is provided in an exterior case, and exhaust gas ejected from the discharge valve is discharged to the outside. In this battery pack, such high-temperature exhaust gas vigorously ejected from the battery cell may be hardly discharged safely to outside. In particular, the exhaust gas ejected from the discharge valve of the lithium ion battery which is a non-aqueous electrolyte secondary battery is ejected vigorously at an abnormally high temperature higher than 400° C. The exhaust gas significantly impairs safety when the exhaust gas causes the exterior case to thermally melt, and is ejected to the outside of the case at a high temperature and may be ignited.

The present invention has been developed for a purpose of preventing the above adverse effects, and a main object of the present invention is to provide a battery pack that prevents a decrease in safety due to high-temperature exhaust gas ejected from an opening discharge valve.

Solution to Problem

A battery pack according to an aspect of the present invention includes a battery block including battery cells connected to one another and a case accommodating the battery block therein. Each battery cell includes a discharge valve provided on an end surface thereof. The discharge valve is configured to open when an internal pressure of the cell exceeds a predetermined pressure. The battery cells constituting the battery block is arranged on a straight line such that respective end surfaces of the battery cell face each other. The battery block includes a discharge gap between the end surfaces of the battery cells facing each other. The discharge gap is configured to guide exhaust gas from the discharge valve to an outside The case includes a lower case having side walls on both sides thereof in which the battery block is arranged between the side walls, an upper case closing an opening of the lower case, a heat dissipation plate arranged in the lower case and between the lower case and the battery block, and a bendable heat-resistant cover protruding from a side edge of the heat dissipation plate and being arranged at a position covering an opening of the discharge gap.

Advantageous Effect of Invention

The battery pack according to the present invention enhances safety by suppressing adverse effects caused by high-temperature exhaust gas ejected from the discharge valve of the battery cell.

DETAIL DESCRIPTION OF PREFERRED EMBODIMENTS

A battery pack according to a first exemplary embodiment of the present invention includes a battery block including battery cells connected to one another and a case accommodating the battery block therein. Each battery cell includes a discharge valve provided on an end surface thereof. The discharge valve is configured to open when an internal pressure of the cell exceeds a predetermined pressure. The battery cells constituting the battery block is arranged on a straight line such that respective end surfaces of the battery cells face each other. The battery block includes a discharge gap between the end surfaces of the battery cells facing each other. The discharge gap is configured to guide exhaust gas from the discharge valve to an outside The case includes a lower case having side walls on both sides thereof in which the battery block is arranged between the side walls, an upper case closing an opening of the lower case, a heat dissipation plate arranged in the lower case and between the lower case and the battery block, and a bendable heat-resistant cover protruding from a side edge of the heat dissipation plate and being provided arranged at a position covering an opening of the discharge gap.

The battery pack described above eliminates adverse effects caused by high-temperature exhaust gas ejected from the opening discharge valve, and ensures high safety. This is because the battery pack described above prevents the case from thermal damage due to the high-temperature exhaust gas ejected from the discharge valve, and prevents an adverse effect that the exhaust gas is ejected to the outside of the case at a high temperature and ignited. This feature is provided by a unique structure of the battery pack described above including, in addition to the battery block in the lower case, the opening of the lower case closed with the upper case, the heat dissipation plate provided in the lower case, the bendable heat-resistant cover protruding from the heat dissipation plate provided on the side edge of the heat dissipation plate, and the heat-resistant cover arranged at a position covering an opening of the discharge gap of the battery block from which the exhaust gas is ejected. In the battery pack described above, the exhaust gas ejected from the discharge valve of the battery cell into the discharge gap collides with the heat dissipation plate and the heat-resistant cover to reduce both thermal energy and kinetic energy. The exhaust gas collides with the heat dissipation plate, so that thermal energy is efficiently conducted to the heat dissipation plate. The heat dissipation plate to which thermal energy is conducted diffuses and dissipates the thermal energy absorbed by the heat dissipation plate. The exhaust gas having the energy thus reduced is discharged to the outside of the case.

In the battery pack described above, the bendable heat-resistant cover protruding from the side edge of the heat dissipation plate is bent and arranged at an ideal position to close the opening of the discharge gap while the battery block is placed in the lower case. The heat-resistant cover closing the opening of the discharge gap at an ideal position allows the exhaust gas ejected into the discharge gap to collide with the inside and diffuse. In this structure, since the exhaust gas ejected from the discharge gap collides with the heat-resistant cover without directly hitting the case, the case is prevented from thermal failure. The battery pack described above thus prevents thermal failure of the case due to the high-temperature exhaust gas ejected from the discharge valve into the discharge gap. The heat-resistant cover reduces and diffuses the energy of motion by causing the exhaust gas ejected from the discharge gap to collide with the cover, and causes the diffused exhaust gas to flow into the case and be released to the outside. The heat-resistant cover efficiently absorbs thermal energy by causing the exhaust gas to collide therewith, and the absorbed thermal energy is conducted to the lower case and dissipated.

The battery pack described above has a feature that the battery block can be simply, easily, and smoothly arranged at a fixed position of the lower case smoothly and efficiently assembled while the thermal energy of the exhaust gas is efficiently reduced and discharged to the outside of the case. This is because, the bendable heat-resistant cover allows an upper end thereof to be expanded while where the battery block is guided to a predetermined position in the lower case, allows the battery block to be quickly guided to the lower case having a gutter shape. Then, the heat-resistant cover is bent to be at a position closing the discharge gap of the battery block. The heat-resistant cover arranged at the position closing the discharge gap causes the exhaust gas ejected into the discharge gap to collide with the inner surface of the heat-resistant cover to efficiently absorb the thermal energy of the gas. Since the battery block ejects the high-temperature exhaust gas from the discharge gap, the heat-resistant cover arranged at this position absorbs thermal energy of the exhaust gas extremely efficiently. The heat-resistant cover is partially provided at a position where the heat-resistant cover closes the opening portion of the discharge gap of the battery block, and is not disposed in an area where the discharge gap is not present. Therefore, the structure in which the heat-resistant cover is partially provided on the side edge of the heat dissipation plate to reduce the energy of the exhaust gas also achieves a feature of reducing the weight of the battery pack and enabling efficient assembly.

In a battery pack of a second exemplary embodiment of the present invention, the heat dissipation plate and the heat-resistant cover are made of plates having a higher thermal conductivity than the lower case.

The battery pack described above has a feature that the thermal energy of the exhaust gas ejected from the discharge valve is conducted to the lower case via the heat-resistant cover and the heat dissipation plate and efficiently dissipated to the outside. This is because the exhaust gas ejected from the discharge valve into the discharge gap collides with the heat dissipation plate and the heat-resistant cover, so that the thermal energy of the exhaust gas is efficiently conducted to the heat dissipation plate and the heat-resistant cover, the heat dissipation plate that has absorbed the thermal energy diffuses over a wide area due to the excellent thermal conduction characteristics and conducts the thermal energy to the lower case, and the lower case dissipates the thermal energy to the outside over a wide area.

In a battery pack of a third exemplary embodiment of the present invention, the lower case and the upper case are made of thermoplastic plastic, and the heat dissipation plate and the heat-resistant cover are made of metal plates.

In a battery pack of a fourth exemplary embodiment of the present invention, the heat dissipation plate and the heat-resistant cover are unitarily made of a single metal plate. The battery pack described above has a feature that the thermal energy of the exhaust gas is quickly conducted from the heat-resistant cover to the heat dissipation plate, and the heat dissipation plate diffuses the absorbed thermal energy over a wide area and dissipates the thermal energy from the lower case to the outside, so that the thermal energy of the exhaust gas can be efficiently dissipated to the outside.

In a battery pack of a fifth exemplary embodiment of the present invention, the heat dissipation plate and the heat-resistant cover are made of aluminum plate(s). The battery pack described above has a feature of quickly and efficiently dissipating the thermal energy of the exhaust gas to the outside while reducing the weight.

In a battery pack of a sixth exemplary embodiment of the present invention, the battery cell is a cylindrical battery. In a battery pack of a seventh exemplary embodiment of the present invention, the heat dissipation plate has a shape along an outer peripheral surface of the cylindrical battery.

In a battery pack of an eighth exemplary embodiment of the present invention, the case has an exhaust opening therein through which the exhaust gas is exhausted to the outside, and the exhaust opening opens at a position facing one of the heat dissipation plate and the heat-resistant cover.

In the battery pack described above, the high-temperature exhaust gas ejected into the discharge gap does not directly hit the case to cause thermal damage. The exhaust gas collides with the heat dissipation plate and the heat-resistant cover, is further diffused in the case to attenuate the energy, and then, is discharged from the exhaust opening. Thus, the high-temperature exhaust gas is not ejected to the outside of the case, and it is possible to reliably prevent the exhaust gas from adversely contacting air outside the case and ignites, and improve safety.

In a battery pack of a ninth exemplary embodiment of the present invention, the case has exhaust openings therein through which the exhaust gas is exhausted to the outside, and the exhaust openings are arranged in a side wall of the lower case to be separated away from each other in a longitudinal direction.

In a battery pack of a tenth exemplary embodiment of the present invention, in the battery block, the battery cells is arranged in rows.

A battery pack according to an eleventh exemplary embodiment of the present invention includes a circuit board connected to the battery block. The circuit board is arranged in the upper case and between a pair of the side walls of the lower case.

In a battery pack of a twelfth exemplary embodiment of the present invention, the battery cell is a non-aqueous electrolyte secondary battery. In a battery pack of a thirteenth exemplary embodiment of the present invention, the battery cell is a lithium ion battery.

Hereinafter, exemplary embodiments of the present invention will be detailed below with reference to the drawings. Note that, in the following description, terms (for example, "top", "bottom", and other terms including those terms) indicating specific directions or positions are used as necessary; however, the use of those terms is for facilitating the understanding of the invention with reference to the drawings, and the technical scope of the present invention is not limited by the meanings of the terms. Parts denoted by the same reference numerals in a plurality of drawings indicate the identical or equivalent parts or members.

The following exemplary embodiment illustrates specific examples of the technical concept of the present invention, and the present invention is not limited by the following exemplary embodiment. In addition, unless otherwise specified, dimensions, materials, shapes, relative arrangements, and the like of the constituent elements described below are not intended to limit the scope of the present invention, but are intended to be illustrative. Further, the contents described in one exemplary embodiment and one working example are also applicable to other exemplary embodiments and working examples. The sizes, positional relationships, and the like of members illustrated in the drawings may be exaggerated in order to clarify description.

Exemplary Embodiment 1

Battery pack 100 illustrated in FIGS. 1 to 4 includes chargeable battery cells 1, case 2 accommodating therein battery block 10 including battery cells 1, and circuit board 3 on which an electronic component, such as a protection circuit for the battery accommodated in case 2 is mounted.

Battery Cell 1

Battery cell 1 is a cylindrical battery including a discharge valve provided on an end surface of the battery. The discharge valve is configured to open when an internal pressure of the battery cell exceeds a predetermined pressure. In the cylindrical battery, an electrode and an electrolytic solution are accommodated in a cylindrical metal case. The metal case has a sealed structure in which a sealing plate is hermetically fixed to an opening of a cylindrical package can with a closed bottom. The package can is fabricated by pressing a metal plate into a cylindrical shape. The sealing plate is caulked and hermetically fixed to a peripheral edge of the opening of the package can with a packing made of an insulating material provided between the sealing plate and the package can.

Although not illustrated, a discharge valve is provided on the sealing plate of battery cell 1 in order to prevent damage due to an abnormally high internal pressure of the metal case. In battery cell 1, an opening of the discharge valve that opens and discharges internal gas is provided in the sealing plate. In battery cell 1, the discharge valve and the opening may be provided in a bottom of the package can instead. The discharge valve is configured to open when the internal pressure rises higher than a predetermined pressure, for example, 1.5 MPa, and prevents such a breakage of the metal case due to the increase of the internal pressure. The discharge valve is configured to open in an abnormal state. While the discharge valve opens, a temperature of battery cell 1 is very high. Thus, the gas and the electrolytic solution (ejected matter) discharged from the opened discharge valve have an abnormally high temperature. In particular, in a battery pack in which battery cell 1 is a non-aqueous electrolyte secondary battery such as a lithium ion battery, the temperature of the exhaust gas becomes an abnormally high temperature higher than 400° C. Since the lithium ion battery is filled with a non-aqueous electrolytic solution, when the electrolytic solution is discharged to the outside of the case at a high temperature, the electrolytic solution may contact oxygen in the air and ignited, and may have an abnormally higher temperature. In not only the lithium ion battery but also other chargeable batteries, the exhaust gas ejected from the opened discharge valve has a high temperature, and thus the reducing of the energy of the discharge gas and the exhausting of the discharge gas to the outside of the case enhance safety.

Battery Block 10

Battery block 10 includes battery cells 1 arranged on a straight line such that respective end surfaces of battery cells 1 face each other. Discharge gap 12 is provided between the end surfaces of adjacent battery cells 1 facing each other. Discharge gap 12 is configured to guides the exhaust gas ejected from the discharge valve to an outside. Battery block 10 shown in FIG. 3 includes four battery assemblies 11 connected in a longitudinal direction. Battery cells 1 constituting battery assemblies 11 are arranged on a straight line. Battery block 10 includes discharge gap 12 provided between battery cells 1 arranged on a straight line. Battery assembly 11 includes battery cells 1 arranged at predetermined positions by inserting battery cells 1 into battery holder 4. In battery holder 4, battery cells 1 are arranged in two rows in parallel to side walls 22 of case 2. In battery block 10 in the drawings, discharge gap 12 discharging the exhaust gas is provided between battery cells 1 arranged on a straight line at positions where the end surfaces of battery cells 1 facing each other arranged in two rows. In battery block 10, lead plate 13 arranged in discharge gap 12 connects battery cells 1 arranged in the longitudinal direction in series to one another. In battery block 10 shown in FIG. 3, battery assemblies 11 including two rows of battery cells 1 in the longitudinal direction are arranged in four lines. Eight battery cells 1 in two rows and four lines are connected in series and in parallel. In battery pack 100 shown in the drawings, battery assembly 11 includes two battery cells 1, battery block 10 includes four battery assemblies 11, and battery block 10 is arranged in case 2. The battery pack of the present invention does not specify the number or connection state of the battery cells accommodated in the case to the structure in the drawings.

Discharge gap 12 is configured to guide the exhaust gas ejected from the discharge valve to the outside. Lead plate 13 connecting battery cells 1 of battery assembly 11 is provided in the discharge gap. Discharge gap 12 has a width ranging, for example, from 1 mm to 5 mm, and diffuses and discharges the exhaust gas ejected from the discharge valve of the end surface of battery cell 1 to the surroundings.

Case 2

Case 2 is made of thermoplastic resin, such as polycarbonate, has an elongated box shape as a whole, and accommodates therein battery block 10 including battery cells 1 connected to one another and circuit board 3 connected to battery block 10. Case 2 made of polycarbonate withstands from a low temperature to a high temperature and is superior in impact resistance. However, the present invention does not specify the case as polycarbonate, and other thermoplastic resins that can be used in a wide temperature range, preferably engineering plastics can also be used.

Figure 1:
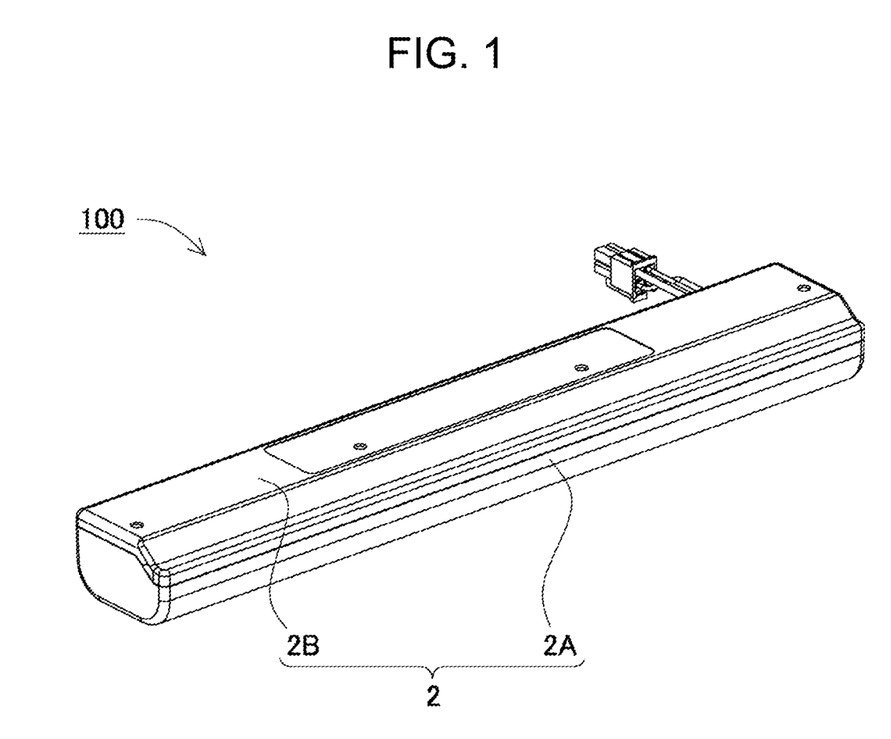
FIG. 1 is a perspective view of a battery pack according to an exemplary embodiment of the present invention.
Figure 2:
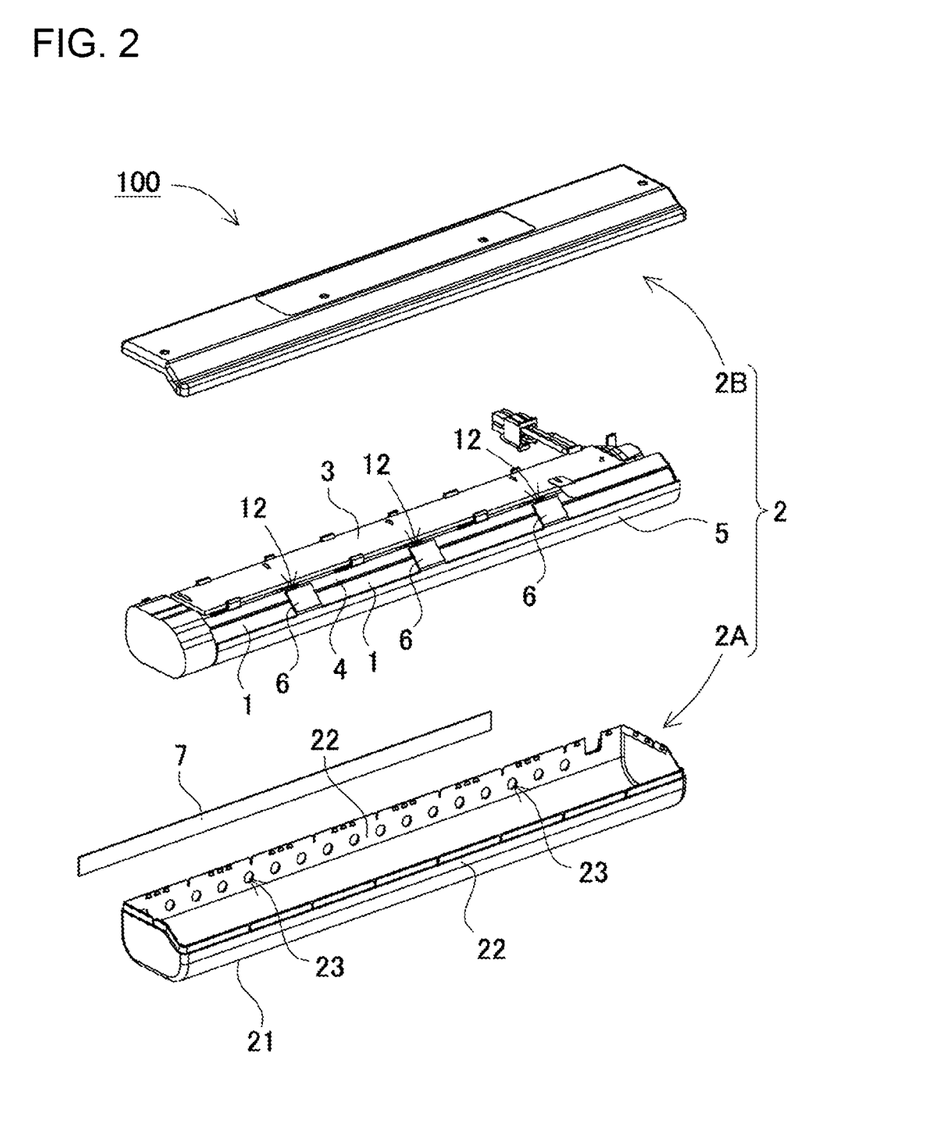
FIG. 2 is an exploded perspective view of the battery pack illustrated in FIG. 1.
Figure 3:
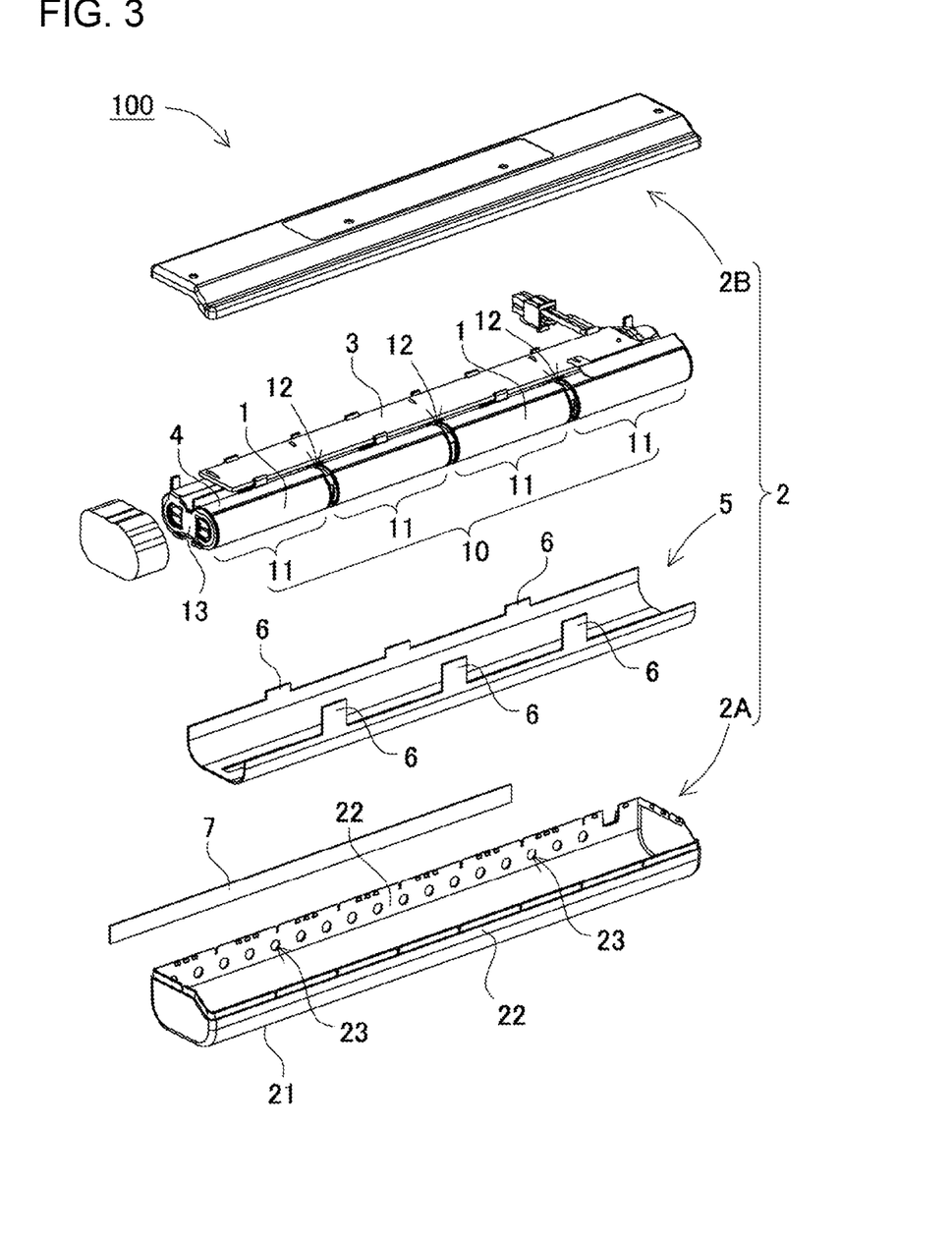
FIG. 3 is an exploded perspective view of the battery pack illustrated in FIG. 2.

Case 2 shown in FIG. 3 includes lower case 2A, upper case 2B closing an opening of lower case 2A, and heat dissipation plate 5 provided in lower case 2A. Lower case 2A shown in FIG. 2 has a gutter shape including side walls 22 provided on both sides of elongated rectangular bottom plate 21. Battery block 10 is provided between side walls 22. Upper case 2B has an outer peripheral edge coupled to lower case 2A to close an upper opening of lower case 2A. In lower case 2A illustrated in FIG. 4, side walls 22 on both sides has a curved shape along the cylindrical battery. Heat dissipation plate 5 is provided among bottom plate 21 and side walls 22. Heat dissipation plate 5 is a heat-resistant metal plate that withstands the temperature of the exhaust gas. Heat dissipation plate 5 prevents the exhaust gas ejected from the discharge valve from being directly ejected into lower case 2A and upper case 2B, absorbs thermal energy of the exhaust gas, and scatters the thermal energy of the exhaust gas in all directions. Lower case 2A has exhaust openings 23 exhausting the exhaust gas to the outside. Exhaust openings 23 are arranged in the longitudinal direction of side walls 22 apart from one another. Exhaust openings 23 open at positions facing heat dissipation plate 5, that is, outside heat dissipation plate 5. Battery pack 100 allows the exhaust gas ejected into discharge gap 12 to collide with heat dissipation plate 5 to reduce the energy, causes the exhaust gas to pass through the gap between battery block 10 and heat dissipation plate 5, and causes the exhaust gas passing through the gap between heat dissipation plate 5 and case 2 to diffuse and be discharged from exhaust opening 23 to the outside.

Heat Dissipation Plate 5

Heat dissipation plate 5 is provided in lower case 2A and between lower case 2A and battery block 10, and is configured to reduce energy of exhaust gas ejected from battery cell 1. Heat dissipation plate 5 is preferably made of a plate more thermal conductive than case 2. Heat dissipation plate 5 absorbs thermal energy of the colliding exhaust gas, and quickly diffuses the absorbed thermal energy over a wide area to conduct the thermal energy to lower case 2A. Lower case 2A dissipates the thermal energy to the outside over a wide area.

As a plate having preferable thermal conduction characteristics, a metal plate is used for heat dissipation plate 5. An aluminum (including aluminum alloy) plate is preferable for heat dissipation plate 5. Since the aluminum plate has heat resistance and excellent thermal conduction characteristics and is light, the thermal energy of the exhaust gas is quickly diffused and efficiently dissipated although heat dissipation plate 5 has a small weight. In battery pack 100 shown in FIG. 4, side walls 22 of lower case 2A are extended along an outer peripheral surface of the cylindrical battery, and heat dissipation plate 5 is arranged among side walls 22 and battery block 10. A portion of heat dissipation plate 5 located on an inner surface of bottom plate 21 of lower case 2A has a planar shape, and a portion of heat dissipation plate 5 provided inside side wall 22 has a curved shape extended along an outer surface of the cylindrical battery.

Battery block 10 is provided inside heat dissipation plate 5. Battery cells 1 are arranged at fixed positions by battery holder 4 in battery block 10. Thus, battery assemblies 11 of battery block 10 are arranged inside heat dissipation plate 5. Heat dissipation plate 5 curved inward has a height that is about half the thickness of battery block 10 so that battery block 10 may be smoothly guided and arranged at a fixed position, and inner surfaces of curved side wall portions of heat dissipation plate 5 contacts both side surfaces of battery block 10. Heat dissipation plate 5 contacting both the side surfaces of curved battery block 10 can make the heat conduction from battery block 10 highly efficient. However, if an air layer is formed between heat dissipation plate 5 and battery block 10, the air layer protests heat conduction. This is because, if curved heat dissipation plate 5 is higher than half the thickness of battery block 10, an opening width of an upper edge of heat dissipation plate 5 becomes narrower than a lateral width of battery block 10, hardly inserting battery block 10 smoothly.

Heat dissipation plate 5 efficiently absorbs the thermal energy of battery block 10 by the inner surfaces of the side wall portions surface-contacting curved surfaces of heat dissipation plate 5 on both sides of battery block 10 and a bottom surface portion surface-contacting a bottom surface of battery block 10. Heat dissipation plate 5 efficiently thermally conducts the absorbed thermal energy to lower case 2A by an outer surface of heat dissipation plate 5 surface-contacting an inner surface of lower case 2A. Heat dissipation plate 5 may be made of an aluminum plate as a metal plate having excellent thermal conduction characteristics, but may be made of a metal plate, such as a copper plate, or another plate, other than an aluminum plate having heat resistance and excellent thermal conduction characteristics.

Heat-Resistant Cover 6

Heat-resistant cover 6 is arranged on a side edge of heat dissipation plate 5 at a position covering an opening of discharge gap 12 between battery assemblies 11. A metal plate made of aluminum or the like having excellent heat resistance and thermal conduction characteristics is suitable for heat-resistant cover 6, as for heat dissipation plate 5. In battery pack 100 shown in FIGS. 3 and 4, heat dissipation plate 5 and heat-resistant cover 6 are unitarily made of a single metal plate, and heat dissipation plate 5 and heat-resistant cover 6 are thus unified with each other. This structure allows heat-resistant cover 6 to be arranged accurately via heat dissipation plate 5. Heat resistant cover 6 is a bendable metal plate since heat-resistant cover 6 is bent to close the opening of discharge gap 12 with battery block 10 being arranged inside. In the structure in which heat-resistant cover 6 and heat dissipation plate 5 are unitarily made of a single metal plate, heat-resistant cover 6 is bendable, and heat-resistant cover 6 can be arranged at an ideal position of the opening of discharge gap 12 of battery block 10 thus being prevented from being displaced.

Figure 4:
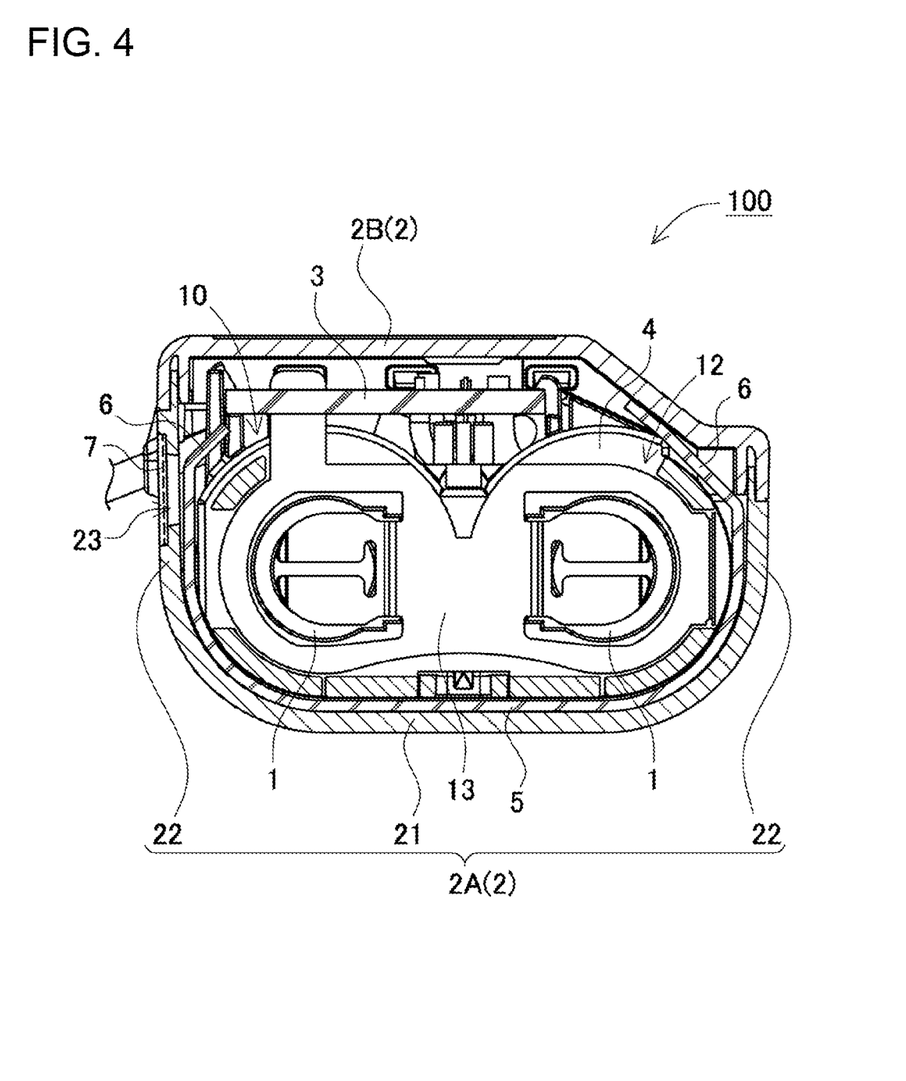
FIG. 4 is a vertical cross-sectional view of the battery pack illustrated in FIG. 1.
Figure 5:
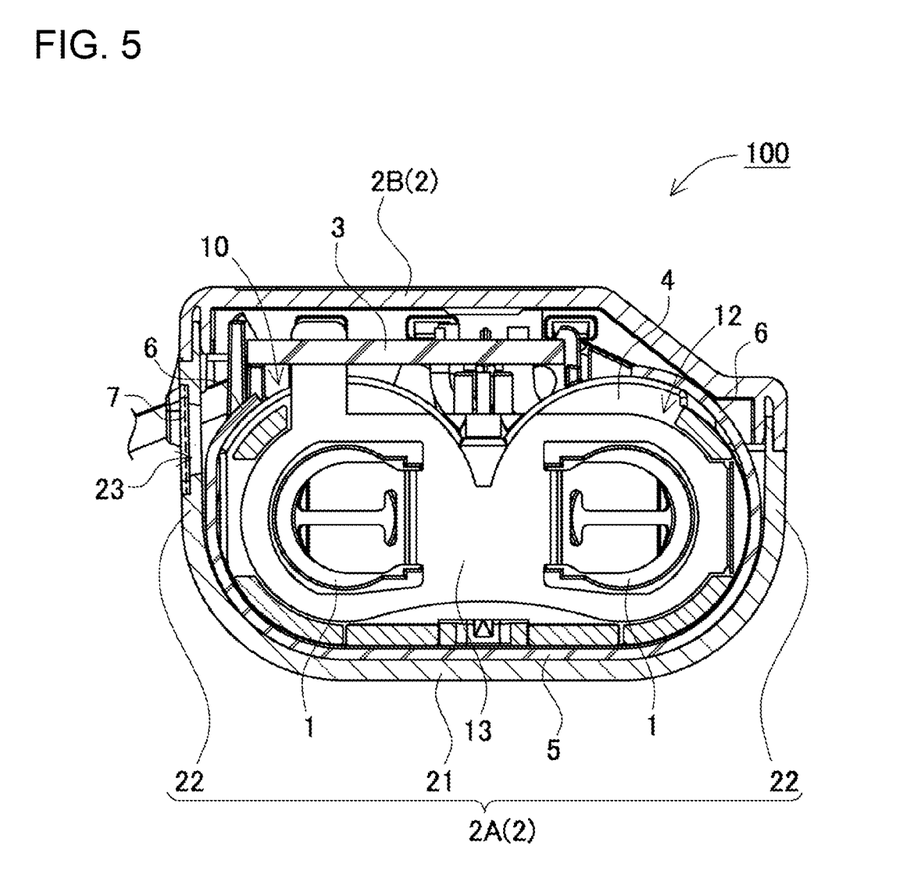
FIG. 5 is a vertical cross-sectional view of another example of a shape of a heat-resistant cover.

In the structure in which heat dissipation plate 5 and heat-resistant cover 6 are unitarily made of a single metal plate and heat-resistant cover 6 is bendable, battery block 10 is guided to a fixed position, as illustrated in FIG. 3, by guiding battery block 10 inward while an upper end side of heat-resistant cover 6 is expanded, and then, bending heat-resistant cover 6 to be provided at a position where discharge gap 12 of battery block 10 is closed, as illustrated in FIG. 2. As illustrated in FIGS. 2 and 4, heat-resistant cover 6 is bent at a boundary between heat-resistant cover 6 and heat dissipation plate 5, so that heat-resistant cover 6 may easily and quickly deform to close discharge gap 12 of battery block 10. However, as illustrated in FIG. 5, heat-resistant cover 6 may be curved in a shape along an outer peripheral surface of battery cell 1. This structure allows heat-resistant cover 6 curved along the opening of discharge gap 12 to effectively close discharge gap 12 and reliably reduce the energy of the exhaust gas.

Heat-resistant cover 6 has a lateral width wider than discharge gap 12 so as to sufficiently cover the opening of discharge gap 12. The lateral width of heat-resistant cover 6 is wider than that of heat-resistant cover 6 by a difference, for example, equal to or larger than 1 mm, preferably equal to or larger than 2 mm, and more preferably equal to or larger than 3 mm. Heat-resistant cover 6 with an excessively large width is hardly vent along the surface of the cylindrical battery to close discharge gap 12 in an ideal state, so that the lateral width is, for example, equal to or less than 20 mm, preferably equal to or less than 15 mm. In battery pack 100 shown in FIG. 3, since four battery assemblies 11 are coupled, three discharge gaps 12 are arranged between respective battery assemblies 11. Since heat-resistant cover 6 closes the opening of each discharge gap 12, three heat-resistant covers 6 are provided along discharge gaps 12 at the side edge of heat dissipation plate 5 shown in FIG. 3. That is, each of heat-resistant covers 6 independently close respective one of discharge gaps 12.

Heat-resistant cover 6 may be long to widen the closed region of the opening of discharge gap 12. In battery pack 100 shown in FIG. 3, circuit board 3 is provided on an upper surface of battery block 10, a leading edge of heat-resistant cover 6 has a length so as to be close to both side edges of circuit board 3, and both heat-resistant cover 6 and circuit board 3 cover the opening of discharge gap 12. Circuit board 3 is made of thermosetting resin, such as glass epoxy, and has more excellent heat resistance than case 2 made of thermoplastic resin. Battery pack 100 having this structure allows almost the entire circumference of the opening portion of discharge gap 12 to be covered with heat dissipation plate 5, heat-resistant cover 6, and circuit board 3 having more excellent heat resistance characteristics than case 2. In the case that a wide gap is produced between heat-resistant cover 6 and circuit board 3, the exhaust gas passes through the gap, and thus, the gap has a width as narrow as possible, for example, equal to or less than 2 mm, preferably equal to or less than 1 mm, to suppress the passage of the exhaust gas. Circuit Board 3

An electronic component (not illustrated) connected to battery cells 1 and constituting a protection circuit for battery cells 1 is mounted onto circuit board 3. The protection circuit prevents battery cells 1 from overcharge and over-discharge, prevents overcurrent, or interrupts current while the temperature rises abnormally.

Battery pack 100 as described above causes the exhaust gas ejected from the discharge valve into discharge gap 12 to collide with heat dissipation plate 5, heat-resistant cover 6, and circuit board 3 to reduce the energy of the gas, and to further diffuse and be discharged to the outside of the case from exhaust opening 23 provided in lower case 2A. Exhaust opening 23 is provided at a position facing heat dissipation plate 5 so as to cause the exhaust gas to collide with heat dissipation plate 5 and heat-resistant cover 6, so that the energy is reduced and diffused, and then the exhaust gas is exhausted to the outside of case 2. Exhaust opening 23 arranged at a position facing heat dissipation plate 5 allows the exhaust gas diffused by heat dissipation plate 5 to be exhausted though exhaust opening 23 to the outside of case 2 accommodating heat dissipation plate 5 therein. In lower case 2A shown in FIG. 3, exhaust openings 23 are arranged on side wall 22 of lower case 2A in the longitudinal direction and separated away from each other in the longitudinal direction. Battery pack 100 causes the exhaust gas ejected into discharge gap 12 to diffuse by colliding with heat dissipation plate 5 and heat-resistant cover 6, and causes the diffused exhaust gas to flow into the gap in case 2 to be discharged from exhaust opening 23 to the outside of case 2. Label 7 is attached onto lower case 2A shown FIGS. 2 to 4. Label 7 is peeled off or melted by the exhaust gas. Label 7 closes the opening portion of exhaust opening 23. In this battery pack, exhaust opening 23 is closed by label 7 to prevent foreign substances from entering into the opening.

INDUSTRIAL APPLICABILITY

The present invention can be effectively used for a battery pack that safely exhausts exhaust gas.

REFERENCE MARKS IN THE DRAWINGS

100 battery pack
1 battery cell
2 case
2A lower case
2B upper case
3 circuit board
4 battery holder
5 heat dissipation plate
6 heat-resistant cover
7 label
10 battery block
11 battery assembly
12 discharge gap
13 lead plate
21 bottom plate
22 side wall
23 exhaust opening

The invention claimed is:
1. A battery pack comprising:
a battery block including a plurality of battery cells connected to one another; and
a case accommodating the battery block therein, wherein
each of the plurality of battery cells includes a discharge valve provided on an end surface of the each of the plurality of battery cells, the discharge valve being configured to open when an internal pressure of the each of the plurality of battery cells exceeds a predetermined pressure,
the plurality of battery cells constituting the battery block is arranged on a straight line such that respective end surfaces the plurality of battery cells face each other,
the battery block includes a discharge gap provided between the respective end surfaces of the plurality of battery cells face each other, the discharge gap being configured to guide exhaust gas from the discharge valve to an outside,
the case includes:
a lower case having side walls on both sides of the case, the battery block is arranged between the side walls;
an upper case closing an opening of the lower case;
a heat dissipation plate provided in the lower case and between the lower case and the battery block; and
a heat-resistant cover protruding from a side edge of the heat dissipation plate, and is arranged at a position covering an opening of the discharge gap, the heat-resistant cover being bendable.

2. The battery pack according to claim 1, wherein the heat dissipation plate and the heat-resistant cover are made of plates having a higher thermal conductivity than the lower case.

3. The battery pack according to claim 2, wherein
the lower case and the upper case are made of thermoplastic plastic, and
the heat dissipation plate and the heat-resistant cover are made of metal plates.

4. The battery pack according to claim 3, wherein the heat dissipation plate and the heat-resistant cover are unitarily made of a single metal plate.

5. The battery pack according to claim 3, wherein the heat dissipation plate and the heat-resistant cover are made of aluminum plates.

6. The battery pack according to claim 1, wherein the plurality of battery cells are cylindrical batteries.

7. The battery pack according to claim 6, wherein
the heat dissipation plate has a shape along outer peripheral surfaces of the cylindrical batteries.

8. The battery pack according claim 1, wherein
the case has an exhaust opening therein through which the exhaust gas is exhausted to the outside, and
the exhaust opening opens at a position facing one of the heat dissipation plate and the heat-resistant cover.

9. The battery pack according to claim 8, wherein
the case has a plurality of the exhaust openings therein through which the exhaust gas is exhausted to the outside, and
the plurality of the exhaust openings is arranged in a side wall of the lower case to be separated away from each other in a longitudinal direction of the lower case.

10. The battery pack according claim 1, wherein the plurality of battery cells are arranged in a plurality of rows in the battery block.

11. The battery pack according to claim 1, further comprising a circuit board connected to the battery block, wherein the circuit board is provided in the upper case and between a pair of the side walls of the lower case.

12. The battery pack according to claim 1, wherein the plurality of battery cells are non-aqueous electrolyte secondary batteries.

13. The battery pack according to claim 12, wherein the plurality of battery cells are lithium ion batteries.

* * * * *